US010285007B2

(12) United States Patent
Hashisho

(10) Patent No.: US 10,285,007 B2
(45) Date of Patent: May 7, 2019

(54) POSITIONING MOBILE DEVICES WITH POSITIONING SUPPORT DEVICES

(71) Applicant: HERE GLOBAL B.V., Eindhoven (NL)

(72) Inventor: Basel Hashisho, Berlin (DE)

(73) Assignee: HERE Global B.V., Eindhoven (NL)

( * ) Notice: Subject to any disclaimer, the term of this patent is extended or adjusted under 35 U.S.C. 154(b) by 3 days.

(21) Appl. No.: 15/381,903

(22) Filed: Dec. 16, 2016

(65) Prior Publication Data

US 2018/0176731 A1 Jun. 21, 2018

(51) Int. Cl.
*H04W 4/02* (2018.01)
*G01S 17/00* (2006.01)
*H04B 10/114* (2013.01)

(52) U.S. Cl.
CPC .......... *H04W 4/023* (2013.01); *G01S 17/00* (2013.01); *H04B 10/1141* (2013.01)

(58) Field of Classification Search
CPC ............ G01S 5/08; G01S 5/04; H04W 64/00; H04W 4/02
See application file for complete search history.

(56) References Cited

U.S. PATENT DOCUMENTS

| | | | |
|---|---|---|---|
| 6,484,031 B1* | 11/2002 | Ruutu | G01S 1/44 342/457 |
| 7,294,822 B2* | 11/2007 | Randall | A63B 24/0021 250/221 |
| 7,337,961 B2* | 3/2008 | Cato | G06Q 30/02 235/380 |
| 7,561,039 B2 | 7/2009 | Nordevall et al. | |
| 8,711,335 B2 | 4/2014 | Sogard | |
| 8,977,298 B2* | 3/2015 | Marti | G01S 5/0252 370/328 |
| 9,609,470 B2* | 3/2017 | Ranki | G01S 3/18 |

(Continued)

FOREIGN PATENT DOCUMENTS

EP 2910967 8/2015

OTHER PUBLICATIONS

Muelaner, J. E. et al., *iGPC—An Initial Assessment of Technical and Deployment Capability*, Proceedings of the 3rd International Conference on Manufacturing Engineering (ICMEN) (Oct. 2008) 805-810.

(Continued)

*Primary Examiner* — Dung Hong
(74) *Attorney, Agent, or Firm* — Alston & Bird LLP

(57) ABSTRACT

The invention relates inter alia to a method performed by at least one apparatus, said method comprising: obtaining radiation signal data comprising results of measurements on radiation signals received at a mobile device and emitted by a positioning support device covering one or more signal areas by sweeping a striped band of radiation across said one or more signal areas; and determining a position of said mobile device within a signal area of said one or more signal areas at least based on said radiation signal data. The invention also relates to a positioning support device for supporting determining of positions of mobile devices in one or more signal areas, comprising: a radiation source covering said one or more signal areas by sweeping a striped band of radiation across said one or more signal areas.

26 Claims, 8 Drawing Sheets

(56) References Cited

U.S. PATENT DOCUMENTS

| | | | |
|---|---|---|---|
| 2005/0230609 A1* | 10/2005 | Randall | A63B 24/0021 |
| | | | 250/234 |
| 2007/0082625 A1* | 4/2007 | Hwang | H04B 7/0408 |
| | | | 455/101 |
| 2011/0018766 A1* | 1/2011 | Steer | G01S 1/14 |
| | | | 342/368 |
| 2014/0285631 A1* | 9/2014 | Janky | G01C 21/206 |
| | | | 348/47 |
| 2014/0370912 A1* | 12/2014 | Kurby | H04W 56/00 |
| | | | 455/456.1 |
| 2015/0099539 A1* | 4/2015 | Titus | H04W 64/00 |
| | | | 455/456.1 |
| 2015/0133173 A1* | 5/2015 | Edge | G01S 1/66 |
| | | | 455/456.6 |
| 2016/0192140 A1* | 6/2016 | Park | H04W 40/244 |
| | | | 455/456.3 |
| 2017/0164157 A1* | 6/2017 | Rowitch | H04Q 9/00 |

OTHER PUBLICATIONS

Weng, D. et al., *Study on an Indoor Tracking System with Infrared Projected Markers for Large-area Applications*, VRCAI 2009. ACM (Dec. 14-15, 2009) 239-246.

\* cited by examiner low pulse rate    medium pulse rate    high pulse rate

POSITIONING MOBILE DEVICES WITH POSITIONING SUPPORT DEVICES

FIELD OF THE DISCLOSURE

The invention relates to the field of positioning and more specifically to the indoor positioning of mobile devices with the help of positioning support devices.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BTLE) based positioning solutions, and wireless local area network (WLAN) based positioning solutions.

Particularly in case signals of opportunity are used for positioning, i.e. signals which primarily server another purpose than positioning, e.g. communication and data transmission, as it is the case with WLAN signals, for example, the positioning accuracy may be not sufficiently precise. Additionally, in case of a WLAN based positioning solution, for instance, the process generally has to be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate models of WLAN access points for positioning purposes.

In the positioning stage, a mobile device may estimate its current location based on own measurements taken from the radio interface and on the data or a subset of data that is available from the training stage. Models or parts of models that have been generated in the training stage may be transferred to mobile devices for use in position determination. Alternatively, the models may be stored in a positioning server to which the mobile devices may connect to for obtaining position information.

A similar approach could be used for a positioning that is based on other types of terrestrial communication nodes or on a combination of different types of terrestrial communication nodes.

While the advantage of this approach is the rather easy setup of the venue environment, as it can in particular utilize deployed existing hardware, such as wireless access points or installed Bluetooth beacons. However, these indoor solutions require manual exhaustive radio-surveying of the buildings including all the floors, spaces and rooms. This is rather expensive and will take a considerable amount of time to build the coverage to the commercially expected level, which in some cases narrowed the potential market segment only to very thin customer base. Also, the diversity of these technologies makes it difficult to build a globally scalable indoor positioning solution, and the integration and testing will become complex if a large number of technologies is needed to be supported in the consumer mobile devices, such as smartphones.

Further, the quality of obtained positioning information may vary in particular based on the efforts put into the training stage or on the up-to-dateness of the collecting data. Additionally, one has to consider the fact, that many mobile devices' wireless (e.g. WLAN or Bluetooth) adapter are originally not designed to provide accurate measures e.g. of the signal strength with fine granularity to user applications. Thus, the final accuracy obtained from such an approach has an error that can range from one to even a few meters.

Therefore, important factors to consider for a successful indoor positioning solution may include:
the accuracy of the determined position,
the independence from additional hardware accessories at the mobile device,
an acceptable effort for deploying any infrastructure,
a minimal distortion or disruption of the environment by the setup of the infrastructure.

SUMMARY OF SOME EMBODIMENTS OF THE INVENTION

Certain aspects or embodiments of the invention may provide a high accuracy of determined positions of mobile devices. Certain aspects or embodiments of the invention may allow determining the position of a mobile device without any additional hardware. Certain aspects or embodiments of the invention may allow for a good expandability and scalability of the approach. Certain aspects or embodiments of the invention may not disturb the interior look of the venue. Certain aspects or embodiments of the invention may allow for improving the accuracy of determined positions and/or the up-to-dateness of positioning data.

According to a first aspect of the invention, a method performed by at least one apparatus is described, the method comprising:
obtaining radiation signal data comprising results of measurements on radiation signals received at a mobile device and emitted by a positioning support device covering one or more signal areas by sweeping a striped band of radiation across the one or more signal areas; and
determining a position of the mobile device within a signal area of the one or more signal areas at least based on the radiation signal data.

According to a second aspect of the invention, a positioning support device is described for supporting determining of positions of mobile devices in one or more signal areas, comprising:

a radiation source covering the one or more signal areas by sweeping a striped band of radiation across the one or more signal areas.

The method may be performed by an apparatus according to the first aspect, which will be described in more detail below. In one example, the apparatus performing the method may be the mobile device receiving the radiation signals, for example. In another example, the apparatus performing the method may be a server, which may be remote from the mobile device receiving the radiation signals. In another example, the method may be performed together by the mobile device receiving the radiation signals and a (remote) server.

Thus, the radiation signal data may be obtained at the mobile device receiving the radiation signals. Additionally or alternatively, the radiation signal data may be obtained at a remote server, e.g. received from the mobile device receiving the radiation signals.

The results of measurements on radiation signals may be representative of one or more characteristics of respective radiation signals. For instance, the results of measurements on radiation signals may comprise information representative of respective times the radiation signals have occurred. The result of measurements on radiation signals may comprise information representative of signal intensities of respective radiation signals. In one example, the result of measurements on radiation signals may comprise information representative of durations of respective radiation signals. In one example, the result of measurements on radiation signals may comprise information representative of wavelengths of respective radiation signals. In one example, the result of measurements on radiation signals may comprise information representative of a rate of respective radiation signals.

The mobile device may receive respective radiation signals by means of a sensor unit of the mobile device. The sensor unit may in particular be or comprise an optical sensor unit. The sensor unit may be or comprise a camera of the mobile device. The sensor unit may be or comprise an ambient light sensor of the mobile device. The sensor unit may be or comprise a proximity sensor of the mobile device. The sensor unit may in particular be a front facing sensor unit. Such technologies are already supported in many mobile user devices, like smartphones, tablets, laptops and in the majority of feature phones. The sensor unit may be sensitive for the radiation signals emitted by the positioning support device. However, the sensor unit may not necessarily be designed specifically for the radiation signals. Rather the main purpose of the sensor unit (e.g. taking pictures or detecting the proximity of a user's head) may be different from receiving the radiation signals of the positioning support device. The sensor unit may in particular point substantially upwards when a user holds the device in his hands in front of them and uses the device (e.g. looks at a screen of the device).

A radiation signal may in particular be received in the form of a pulse. As the striped band of radiation is swept across the mobile device, the mobile device may in particular receive radiation signals in the form of (single) pulses, wherein a pulse is caused by a single stripe of the striped band of radiation passing over the mobile device.

The position support device used in method according to the first aspect may be a device dedicated to support positioning of mobile devices and may have been specifically deployed for supporting the positioning of mobile devices. The positioning support device may be installed above the one or more signal areas, for instance at a ceiling above the one or more signal areas. The positioning support device may cover one signal area. The positioning support device may also cover multiple signal areas. A signal area may be understood as a two or three dimensional area in which the mobile device may receive radiation signals of the positioning support device (e.g. with a signal intensity above a certain threshold or with a certain quality). A signal area may be a geographic area on or above the ground. A signal area may cover a substantially rectangular surface on or above the ground. The positioning support device may in particular comprise a radiation source. The positioning support device may in particular be a positioning support device according to the second aspect of the invention.

Likewise, the position support device according to the second aspect of the invention may in particular be configured to produce a striped band of radiation to be used in a method according to the first aspect of the invention. A positioning support device may in particular be understood as a beacon. The positioning support device is not necessarily a one-piece device, but may equally well comprise multiple parts or units, which may be deployed at different places. The position support device may be configured for mounting to a ceiling. In one example, the radiation source may emit the radiation from the ceiling down into a signal area substantially beneath the radiation source.

A striped band of radiation is in particular understood to mean that at a certain time or time interval and in a (e.g. substantially horizontal) plane through a signal area the positioning support device produces a pattern of radiation in the form of (spatial) stripes arranged in a band. The striped band thus comprises stripes with (higher) radiation intensities and stripes with no or lower radiation intensities in an alternating manner. A band may in particular be understood as an elongated, e.g. substantially rectangular area extending longer in one direction (length of the band) than the other (width of the band). The stripes may in particular substantially extend along the whole length of the band. The length of the band may in particular substantially span across the whole signal area in one dimension.

The striped band of radiation is swept across the signal area (or the signal areas) in particular substantially transverse to its elongate extension. The striped band of radiation may be swept across the signal area with a substantially constant velocity. The striped band of radiation may be swept across the one or more signal areas with a predefined velocity.

That the striped band of radiation covers one or more signal areas is in particular understood to mean that the positioning support device projects the radiation in the form of a striped band of radiation into the respective signal area. The positioning support device may cover the one or more signal areas substantially continuously.

Determining a position of the mobile device may be understood to mean that a position estimate of the mobile device is determined. Determining a position of the mobile device may be understood to mean that information being representative of the position of the mobile device is determined. The position of the mobile device does not need to be determined completely. It may also be possible that information is obtained which only partly describes the position of the mobile device (e.g. only with respect to a certain dimension or direction, e.g. only one coordinate or only one angle). The determined position of the mobile device may be a relative position (e.g. with respect to a reference frame, such as the signal area) or an absolute position (e.g. a specific position on the surface of the earth).

In particular, the determining of a position of the mobile device may comprise determining position information representative of a substantially horizontal position of the mobile device from the radiation signal data, e.g. substantially transverse to a direction of the stripes of the striped band of radiation and/or substantially along a direction of the stripes of the striped band of radiation, as will be explained in more detail further below.

With regard to position information representative of a substantially vertical position (height) of the mobile device it may be possible to determine this position information based on information other than the radiation signal data. As an example, the mobile device may store a parameter (e.g. a device holding height) representative of the height of the mobile device (e.g. because the parameter is a default parameter, or because the parameter was input by the user, or because the parameter was derived from a user input, such as the height of the user).

Additionally or alternatively, in particular for a refined height determination, position information representative of a substantially vertical position of the mobile device may be determined based on the radiation signal data. As an example, if radiation signals from two overlapping signal areas are received at one location, respective radiation signal data from both signal areas can be used to determine the height (as the overlap or the received signals change with the height of the mobile device). If such refinement can be made, the height can be considered as the last identified height and e.g. be used until new position information can be determined.

That the position of the mobile device is determined within a signal area of the one or more signal areas is understood to mean that it may not only determined in which signal area the mobile device is positioned but also where in a signal area the mobile device is positioned.

That the position of the mobile device is determined at least based on the radiation signal data is understood to mean that the position can be determined only based on the radiation signal data or the that the position can be determined based on the radiation signal data and additional data (e.g. radio signal data, as will be explained in more detail below).

The radiation may in particular be light. Light may be visible light, infrared light or ultraviolet light. Thus, light may be understood as radiation of the visible and/or invisible spectrum. Light of the visible spectrum may be understood as radiation of wavelengths with approximately 380 nm to 780 nm. Light of the invisible spectrum may in particular be ultraviolet (UV) radiation, i.e. light with wavelengths approximately from 10 nm to 380 nm, or infrared (IR) radiation, i.e. light with wavelengths approximately from 780 nm to 1 mm.

According to an exemplary embodiment of the method according to the first aspect of the invention, the radiation is laser radiation, in particular laser radiation of the non-visible spectrum, preferably of the infrared spectrum, in particular of the near infrared spectrum.

In this regard, according to an exemplary embodiment of the position support device according to the second aspect of the invention, the radiation source is a laser radiation source, in particular emitting laser radiation of the non-visible spectrum, preferably of the infrared spectrum, in particular of the near infrared spectrum.

Laser radiation is understood to be radiation produced through a process of optical amplification based on the stimulated emission of electromagnetic radiation. The laser radiation may in particular be laser light. The laser radiation may in particular be laser radiation of the nonvisible spectrum, in particular laser radiation of the IR spectrum, i.e. with wavelengths approximately from 780 nm to 1 mm. The laser radiation may in particular be near-infrared radiation (NIR, i.e. 0.78 µm-3 µm e.g. IR-A radiation (0.7 µm-1.4 µm) or IR-B (1.4 µm-3 µm)), mid-infrared radiation (MIR, i.e. 3 µm-50 µm) or far-infrared radiation (FIR, i.e. 50 µm-1000 µm).

In particular in case of (laser) light of the invisible spectrum a distortion or disruption of the environment by the setup of the infrastructure can be kept minimal or can be avoided.

According to an exemplary embodiment of the method according to the first aspect of the invention the radiation signal data comprises results of timing measurements on the received radiation signals.

A result of a timing measurement may in particular be representative of a time one or more radiation signals have occurred at (e.g. with respect to a peak intensity), a duration of one or more radiation signals, a temporal distance between two (subsequent) radiation signals or two (subsequent) trains of radiation signals. The timing measurement may be an absolute or a relative timing measurement. The timing measurement may allow for a precise position determination.

According to an exemplary embodiment of the method according to the first aspect of the invention, the striped band of radiation is swept across the one or more signal areas in a direction substantially transverse to a direction of the stripes of the striped band of radiation in sweeping cycles.

In this regard, according to an exemplary embodiment of the position support device according to the second aspect of the invention, the positioning support device is configured to sweep the striped band of radiation across the one or more signal areas in a direction substantially transverse to a direction of the stripes of the striped band of radiation in sweeping cycles.

In one example, the striped band of radiation is swept forwards and backwards or back and forth across the one or more signal areas to cover the one or more signal areas. A full sweeping cycle may be understood to be completed when the striped band of radiation is swept over the same position in the same direction. A sweeping cycle may be completed after the positioning support device has swept the striped band of radiation back and forth over one or more of the one or more signal areas. The time of a sweeping cycle may be called the sweeping cycle time of a certain signal area. The sweeping cycle time may be a predefined sweeping cycle time. The sweeping cycle time may be a constant. The sweeping cycle time may be specific for a signal area and/or specific for a positioning support device.

It may in particular be possible to detect the direction, the striped band of radiation was swept across the mobile device. In this regard, the method according to the invention may in particular comprise the step of detecting the direction, the striped band of radiation was swept across the mobile device (sweeping direction). As an example, the striped band of radiation may be asymmetric with regard to the sweeping direction. As an example, the first stipe of the striped band of radiation may be wider than the last stipe of the striped band of radiation or any other stripe of the striped band of radiation.

According to an exemplary embodiment of the position support device according to the second aspect of the invention, the positioning support device is configured for delaying a start of a sweeping cycle.

For instance, the positioning support device may be configured to delay the start of some or of each sweeping cycle. A delayed start of a sweeping cycle is in particular understood to mean that after a completed sweeping cycle, the next sweeping cycle is not immediately started, but delayed for a certain time interval. The delay may be predetermined. The delay may be specific to a signal area or a radiation source. The delay may also be randomly determined, in particular for each delayed start. The delay of a start of a sweeping cycle may be delayed for a time interval smaller than the duration of the respective sweeping cycle.

The delay of a start of a sweeping cycle may in particular improve the scalability of a system comprising multiple signal areas or positioning support devices. Adjacent signal areas may be partly overlapping, which may result in colliding striped bands of radiation sweeping across the same location at the same time. This may result in a mobile device receiving at one position radiation signals from two signal areas. However, if the starts of the respective sweeping cycles for the adjacent signal areas are delayed for different time intervals, the likelihood of another collision (at least at the same position) is reduced.

According to an exemplary embodiment of the method according to the first aspect of the invention, at least a part of the one or more signal areas covered by the positioning support device has a substantially pyramidal geometry.

In this regard, according to an exemplary embodiment of the position support device according to the second aspect of the invention, the positioning support device is configured to provide for at least a part of the one or more signal areas covered by the support device a substantially pyramidal geometry.

For instance, each of the one or more signal areas covered by the positioning support device has a substantially pyramidal geometry. In other words, the positioning support device provides a pyramid-like coverage of the one or more signal areas with radiation. For instance, the positioning support device may define the apex of a pyramid and cover a signal area with a pyramidal geometry below the positioning support device. Alternatively, the positioning support device comprises one or more deflection units, each deflection unit defining the apex of a respective pyramid and covering a respective signal area with a pyramidal geometry below the respective deflection unit. A signal area having a substantially pyramidal geometry may in particular have a rectangular base.

In this regard, according to an exemplary embodiment of the position support device according to the second aspect of the invention, the positioning support device further comprises:
one or more deflection units for deflecting radiation of the radiation source into the one or more signal areas.

The deflection units may be mirrors, in particular curved mirrors. In one example, the deflections units are curved, convex mirrors. The deflection units may be mountable to the ceiling. The radiation source may emit radiation towards the deflection units (e.g. substantially parallel to the ceiling). The deflection units may then deflect the radiation down into respective signal areas. For instance, multiple deflection units are provided, wherein each deflection unit is configured for deflecting radiation of the radiation source into a respective signal area. Multiple deflection units may form an array of deflection units. For instance, the deflection units may be arranged along a hallway or corridor. This may allow for providing signal areas along a hallway or corridor with a single radiation source.

According to an exemplary embodiment of the method according to the first aspect of the invention, the striped band of radiation comprises stripes spatially tilted to one another.

In this regard, according to an exemplary embodiment of the position support device according to the second aspect of the invention, the positioning support device is configured for providing the striped band of radiation with stripes spatially tilted to one another.

That the striped band of radiation comprises stripes spatially tilted to one another is in particular understood to mean that at a certain time or time interval and in a (e.g. substantially horizontal) plane through a signal area the positioning support device produces a pattern of radiation with stripes arranged in a band and spatially tilted to one another. For example, the stripes of the striped band of radiation are fanned out in the direction of one end of the striped band of radiation. For instance, the striped band of radiation has a larger width at one end than at the other end. For instance every stripe of the striped band of radiation is tilted a certain amount (e.g. the same amount) with respect to the previous stripe. As a result, the inter-stripe distance between two adjacent stripes may increase and decrease along the length of the striped band of radiation, respectively. Thus, the density of stripes of the striped band of radiation may be higher on one end of the striped band of radiation and lower on the other end of the striped band of radiation. However, the stripes of the striped band of radiation may still form a substantially elongated band. This may allow for a position determining in a direction along the stripes of the striped band of radiation. Preferably, the ratio of inter-stripe distances is be preserved along the length of the striped band of radiation. This may in particular facilitate determining an identifier, as explained further below. The stripes of the striped band of radiation may be considered semi-parallel stripes.

According to an exemplary embodiment of the method according to the first aspect of the invention, the method further comprises:
determining an identifier identifying one of the one or more signal areas and/or the positioning support device from the radiation signal data.

According to an exemplary embodiment of the position support device according to the second aspect of the invention, the positioning support device is configured to modulate the striped band of radiation such that it carries an identifier identifying one of the one or more signal areas and/or the positioning support device.

The striped band of radiation may be modulated such that an identifier can be determined from the radiation signal data. For instance, an identifier may be encoded into the striped band of radiation. As an example, the number of stripes of the striped band of radiation, the width of the stripes of the striped band of radiation (which may correspond to a pulse length of pulse detected by the mobile device) and/or the distance between the stripes of the striped band of radiation (which may correspond to a duration between pulses detected by the mobile device) may be used for encoding an identifier into and determining the identifier from the striped band of radiation. Alternatively or additionally, it may be possible to use a (relative or absolute) intensity of the stripes of the striped band of radiation for encoding the identifier into the striped band of radiation. Determining an identifier may allow for determining the signal area, the mobile device is located in, and/or obtaining characteristics of the respective signal area.

The identifier may be a locally (e.g. with respect to a certain area or building) or globally (e.g. worldwide) unique identifier. The identifier may identify a signal area and/or a positioning support device. Thus, the identifier may be unique with respect to a signal area and/or with respect to a positioning support device.

It is possible that the identifier may only be determined in case the striped band of radiation is swept across the mobile device in a particular direction (e.g. while sweeping forwards or while sweeping backwards across the signal area). This may be used to determine the direction, the striped band of radiation was swept across the mobile device.

According to an exemplary embodiment of the method according to the first aspect of the invention, the determining of a position of the mobile device within a signal area of the one or more signal areas comprises:

determining position information representative of a position of the mobile device substantially transverse to a direction of the stripes of the striped band of radiation from the radiation signal data.

As an example, the position information may be representative of a horizontal position (e.g. in the y-direction) in the signal area. The position information may, for example, be representative of a distance from a border of the signal area. As another example the position information may be representative of an angle (e.g. a sweeping angle) of a plane, in which the mobile device is positioned, and thus indicating the distance from a border of the signal area. For this, certain characteristics of the signal area or the positioning support device may need to be known (e.g. from a database). For instance characteristics describing the sweeping of the striped band of radiation across the signal area may be known. For instance, the determining may be based on a known sweeping velocity. For instance, the determining may be based on a known sweeping cycle time. For instance, the determining may be based on a known sweeping distance, which may be the extension of the signal area in the sweeping direction (i.e. in particular traverse to the direction of the strips of the striped band of radiation).

According to an exemplary embodiment of the method according to the first aspect of the invention, the determining of position information representative of a position of the mobile device substantially transverse to the direction of the stripes of the striped band of radiation is based on a timing measurement representative of a time interval between passes of the striped band of radiation at the mobile device.

As an example, a time interval is determined between a train of radiation signals received during a forward sweep of the striped band of radiation and a train of radiation signals received during a backwards sweep of the striped band of radiation. The shorter or the longer the time interval the closer or farther the mobile device is positioned towards or from a respective border of the signal area.

According to an exemplary embodiment of the method according to the first aspect of the invention, the determining of position information representative of a position of the mobile device substantially transverse to the direction of the stripes of the striped band of radiation comprises determining a sweeping angle of a plane intersecting with the position of the mobile device within a signal area of the one or more signal areas.

For instance, if a (horizontal) distance from a border of the signal area substantially transverse to a direction of the stripes of the striped band of radiation is known, a sweeping angle of a plane intersecting with the position of the mobile device can be determined from this distance due to a sinusoidal proportionality.

According to an exemplary embodiment of the method according to the first aspect of the invention, the determining of a position of the mobile device within a signal area of the one or more signal areas comprises:

determining position information representative of a position of the mobile device substantially along a direction of the stripes of the striped band of radiation from the radiation signal data.

As an example, the position information may be representative of a horizontal position (e.g. in the x-direction) in the signal area. The position information may, for example, be representative of a distance from a border of the signal area. For this, certain characteristics of the signal area or the positioning support device may need to be known (e.g. from a database). For instance, characteristics describing the tilt of the stripes of the striped band of radiation may be known. For instance the determining may be based on a known width of the striped band of radiation at one side or at both sides. For instance, the determining may be based on a known sweeping velocity. For instance the determining may be based on a known distance, which may be the extension of the signal area along to the direction of the strips of the striped band of radiation (i.e. in particular transvers to the sweeping direction).

According to an exemplary embodiment of the method according to the first aspect of the invention, the determining of position information representative of a position of the mobile device substantially along the direction of the stripes of the striped band of radiation is based on a timing measurement representative of a width of the striped band of radiation at the mobile device.

As an example, a time duration for the striped band of radiation (i.e. all stripes of the striped band) to pass the mobile device is determined during a forward or backward sweep of the striped band of radiation. In connection with e.g. a known sweeping velocity, a position along a direction of the stripes of the striped band of radiation may be determined from the radiation signal data.

Alternatively, it may be possible to base the determining of position information representative of a position of the mobile device substantially along the direction of the stripes of the striped band of radiation on a timing measurement representative of frequency or pulse rate of the occurrence of radiation signals. This may be made possible as the frequency or pulse rate of the radiation signals changes along the direction of the stripes of the striped band due to the spatial tilt of individual stripes of the striped band of radiation.

According to an exemplary embodiment of the method according to the first aspect of the invention, the obtained radiation signal data comprises results of measurements on radiation signals received at the mobile device during at least one complete sweeping cycle.

It is also possible that the obtained radiation signal data comprises results of measurements on radiation signals received at the mobile device during multiple complete sweeping cycles. For instance, the obtained radiation signal data comprises results of measurements on radiation signals in a buffer. The buffer may store results of measurements on radiation signals received in the past. Radiation signal data comprising results of measurements on radiation signals received at the mobile device during at least one complete sweeping cycle may be realized by taking measurements at the mobile device for at least the sweeping cycle time or multiple sweeping cycle times.

As already described, the obtained radiation signal data may in particular comprise results on timing measurements. A timing measurement may be representative of a duration of a radiation signal. A timing measurement may also be representative of a duration between radiation signals. As an example, the obtained radiation signal data may store the occurrence of radiation signals (e.g. of radiation peaks) by logging a (relative or absolute) timing information. For instance, time stamps may be stored for each received radiation signal. Additionally or alternatively, for each received radiation signal a time delta with regard to a previously received pulse may be stored.

According to an exemplary embodiment of the method according to the first aspect of the invention, the method further comprises:

checking the obtained radiation signal data for matching sequences of results of measurements on received radiation signals received at the mobile device for identifying radiation signal data to be used for the determining of a position of the mobile device within a signal area of the one or more signal areas.

A matching sequence may be understood to mean, that a series of results of measurements on radiation signals may have a similarity with each other. For instance, results of measurements may be considered similar if their difference is within a certain threshold. However, the results may in particular be found in reverse order in the radiation signal data, as the striped band of radiation may be swept across the mobile device in reverse direction (every second time). For instance, if the radiation signal data comprises results on timing measurements which are representative of durations between radiation signals, the same durations (e.g. within a certain threshold) may be determined (but in reverse order). If two matching sequences are found, the one matching sequence can be considered as results of a first sweep of the striped band of radiation across the mobile device (sweeping forward) and the other matching sequence can be considered as results belonging to a second sweep of the striped band of radiation across the mobile device (sweeping backward). This may in particular allow for identifying radiation signals belonging to individual sweeps of the striped band of radiation across the mobile device. The results of measurements on received radiation signals identified to belong to matching sequences can be used in the further determining of a position of the mobile device.

According to an exemplary embodiment of the method according to the first aspect of the invention, the method further comprises:

obtaining radio signal data comprising results of measurements on radio signals of at least one communication node received at the mobile device, wherein the measurements on radio signals temporally correspond to the measurements on the radiation signals.

In an example embodiment, the at least one communication node comprises at least one terrestrial communication node, since satellite signals may be less suited for indoor positioning. In an example embodiment, the at least one communication node comprises at least one non-cellular terrestrial communication node. The at least one non-cellular terrestrial communication node could comprise any non-cellular ground based communication node that is configured to transmit radio signals. In an example embodiment, it comprises at least one wireless local area network access point and/or at least one Bluetooth transmitter and/or at least one BTLE transmitter. It is to be understood that a Bluetooth transmitter and a BTLE transmitter could optionally be a part of a respective transceiver. WLAN and Bluetooth communication nodes are already installed in many buildings. Furthermore, WLAN and Bluetooth technologies are already supported in many mobile user devices, like smartphones, tablets, laptops and in the majority of feature phones. Using WLAN access points, Bluetooth transmitters and/or BTLE transmitters as communication nodes may thus have the effect that the supported positioning can be based on an existing infrastructure in buildings and on existing capabilities in mobile devices. As a result, the approach may be globally scalable and have low maintenance and deployment costs.

It is to be understood that the at least one communication node could also comprise at least one cellular transmitter, like a base station of a cellular communication network. However, due to the narrow frequency bands of cellular signals, WLAN and Bluetooth nodes may generally enable a more accurate positioning. Furthermore, communication nodes transmitting any other kind of wireless signals, including for instance ultra-wideband (UWB) signals or any wireless signals that might emerge in the future, may be used as well.

The radio signal data comprising results of measurements on radio signals may in particular comprise a received signal strength and/or path losses and/or timing measurements of the radio signal of the at least one communication node. Additionally, the signal data comprising results of measurements on radio signals may in particular comprise an identifier of the at least one communication node.

If the communication node is a WLAN access point, for example, the results of the measurements included in a radiation signal data may contain for instance a basic service set identification (BSSID), like the medium access control (MAC) address of observed access points (APs), the service set identifier (SSID) of the access points, and the signal strength of received signals (received signal strength indication RSSI or physical Rx level in dBm with a reference value of 1 mW, etc.). If the communication node is a transmitter of a cellular communication network, for example, the results of the measurements may contain for instance a global and/or local identification of the cellular network cells observed, their signal strengths and/or path losses and/or timing measurements like timing advance (TA) or round-trip time. If the communication node is of a further type, the results of the measurements may contain for example similar data.

The combination of obtaining radiation signal data and radio signal data may in particular have the advantage of a further improved accuracy of the positioning result. The horizontal positioning accuracy of 2-3 meters, which may be achieved by radio signal data alone, may even be undercut by the combination. Also, as close as 100% reliability in floor detection may be achieved.

The measurements on radio signals may temporally correspond to the measurements on the radiation signals in case it can be assumed that the mobile device measuring the radio signals and the radiation signals has not moved or only negligibly moved in the meantime. That the measurements on radio signals temporally correspond to the measurements on the radiation signals is in particular understood to mean that the measurements on radio signals and the measurements on radiation signals have been measured at the same time or not more than a maximum time apart.

According to an exemplary embodiment of the method according to the first aspect of the invention, the method further comprises:

using the obtained radio signal data for the determining of a position of the mobile device within a signal area of the one or more signal areas.

For instance, the determining of a position of the mobile device within a signal area of the one or more signal areas is based on both, the obtained radiation signal data and the obtained radio signal data. For instance, first, a position of the mobile device may be determined based on the radio signal data. Then, the radiation signal data may be used to further improve the accuracy of the position determined based on the radio signal data. In order to improve the accuracy of the position determined based on the radio signal data, an algorithm may be used in order to consider the additional information provided by the radiation signal data. As an example, Kalman filtering, also known as linear quadratic estimation (LQE), may be used for improving the accuracy of the determined position. Kalman filtering is generally understood to be an algorithm that uses a series of measurements containing inaccuracies, and produces estimates of unknown variables that tend to be more precise than those based on a single measurement alone.

According to an exemplary embodiment of the method according to the first aspect of the invention, the method further comprises:

updating a database with the obtained radio signal data for the position determined based on the radiation signal data.

The database may be a database of a positioning server, for example. The database may comprise radio signal data and/or radiation signal data. The database may in particular comprise a radio model, which was generated based on previously obtained radio signal data. Accordingly, a radio model may be updated based on the radio signal and the radiation signal data.

A radio model may be defined for example by a set of measurements on radio signals mapped to grid points of a grid. Alternatively, a radio model may be defined for example by the values of a finite number of parameters. While such parameters may be understood to generally define a radio model, specific values of the parameters are to be understood to define a specific radio model for a specific communication node. A general radio model as well as a specific radio model may be for instance in the form of an equation or a set of equations including the parameters or the values of the parameters, respectively. If the radio model is a path loss model, the parameters may comprise for example an estimated location of the communication node. The parameters of a path loss model may further comprise for example a transmission power used by the communication node. Alternatively, the parameters may comprise a received signal strength at a predetermined reference distance to the communication node. Such a reference signal strength is also referred to as apparent transmission power. Relying on an apparent transmission power as a parameter rather than the actual transmission power may have the effect that it is easier to determine in a reliable manner based on measured values. The parameters of a path loss model may further comprise for example a path loss exponent for signals transmitted by the communication node or an average path loss of signals transmitted by the communication node. Values for a combination of a communication node location, some transmission power related parameter and some path loss related parameter may be suited to comprehensively define a radio model.

Due to the radiation signal data, it is expected that a (more) precise estimate of the position of the mobile device can be obtained. Thus, it may be assumed that the obtained radio signal data (e.g. measurements on radio signals) have been measured at the (more precise) position determined based on the radiation signal data. This may improve the quality of position estimates based on data of the database.

According to an exemplary embodiment of the method according to the first aspect of the invention, the method further comprises:

obtaining a database or a part thereof at the mobile device, the database comprising information on characteristics on at least one of the one or more signal areas and/or the positioning support device; wherein the determining of a position of the mobile device within a signal area of the one or more signal areas is performed at the mobile device at least based on the radiation signal data and optionally based on the radio signal data using the obtained database or the part thereof.

The characteristics on the one or more signal areas and/or the positioning support device may in particular be sufficient for determining a (horizontal) position of the mobile device in a corresponding signal area. Non limiting examples of characteristics on a signal area or a positioning support device are an identifier, a sweeping distance, a sweeping cycle time, a maximum sweeping angle, a sweeping velocity and a width (substantially transverse to the direction of the stripes) of the striped band of radiation at one or both ends.

This may allow the mobile device to perform the determining of its position locally at the mobile device. The database or part thereof may be obtained from a positioning server, for example. For instance, the mobile device may obtain a database or a part thereof with respect to a certain area, e.g. an area of interest (e.g. a country, a city or a building). The mobile device may obtain a database or a part thereof, with respect to an area, the mobile device is located in.

According to an exemplary embodiment of the method according to the first aspect of the invention, the obtaining of the radiation signal data and optionally the radio signal data is performed at a server; wherein the determining of a position of the mobile device within a signal area of the one or more signal areas at least based on the radiation signal data and optionally based on the radio signal data is performed at the server; wherein the method further comprises:

sending the determined position information to the mobile device.

The server may be a positioning server and may store or have access to a database or a part thereof comprising information on characteristics on at least one of the one or more signal areas and/or the positioning support device as described above. The mobile device may send radiation signal data and optionally the radio signal data to the server. This may allow the mobile device to trigger the determining of its position on a remote server. A download of the database or a part thereof to the mobile device is not necessary in this case. Additionally, in case radiation signal data and radio signal data is obtained at the server, the database may be updated, as already described above.

sAccording to the first aspect of the invention, an apparatus is described comprising means for According to the first aspect of the invention, an apparatus is described comprising means for performing the steps of the method according to the first aspect.

The means of the presented apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The presented apparatus may comprise a single means for all functions, a common plurality of means for all functions, or a plurality of different means for different functions.

According to the first aspect of the invention, another apparatus is described, comprising at least one processor and at least one memory including computer program code for one or more programs, the at least one memory and the computer program code configured to, with the at least one processor, cause the apparatus to perform the steps of the method according to the first aspect.

The presented apparatuses may be modules or components for a device, for example chips. Alternatively, the presented apparatuses may be devices. The presented apparatuses may comprise only the disclosed components (e.g. means) or may further comprise one or more additional components.

The presented apparatuses may in particular be able to receive and measure the described radiation signals and/or to receive and measure the described radio signals. The presented apparatuses may in particular be able to determine a position of a mobile device (which is one example of an apparatus according to the first aspect).

The presented apparatuses may be or may be one of: a chip; a module for a server; a server; a module for a mobile device; and a mobile device.

A server could be a dedicated positioning server or some other server. A mobile device may be a mobile communication device. A module may in particular be a chip, circuitry on a chip or a plug-in board, for an apparatus. Optionally, the presented apparatuses may comprise various other components, like a data interface, a user interface, a further memory, a further processor, etc.

According to the first aspect of the invention, a computer program code is described, the computer program code when executed by a processor causing an apparatus to perform the steps of the method according to the first aspect.

According to the first aspect of the invention, a non-transitory computer readable storage medium is described including one or more sequences of one or more instructions which, when executed by one or more processors, cause an apparatus to perform the steps of the method according to the first aspect.

The non-transitory computer readable storage medium may be tangible. The computer program code causes at least one apparatus to perform the steps of any one embodiment of the presented method when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a third aspect of the invention, a system is disclosed, comprising:
a position support device according to the second aspect; and
an apparatus according to the first aspect.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
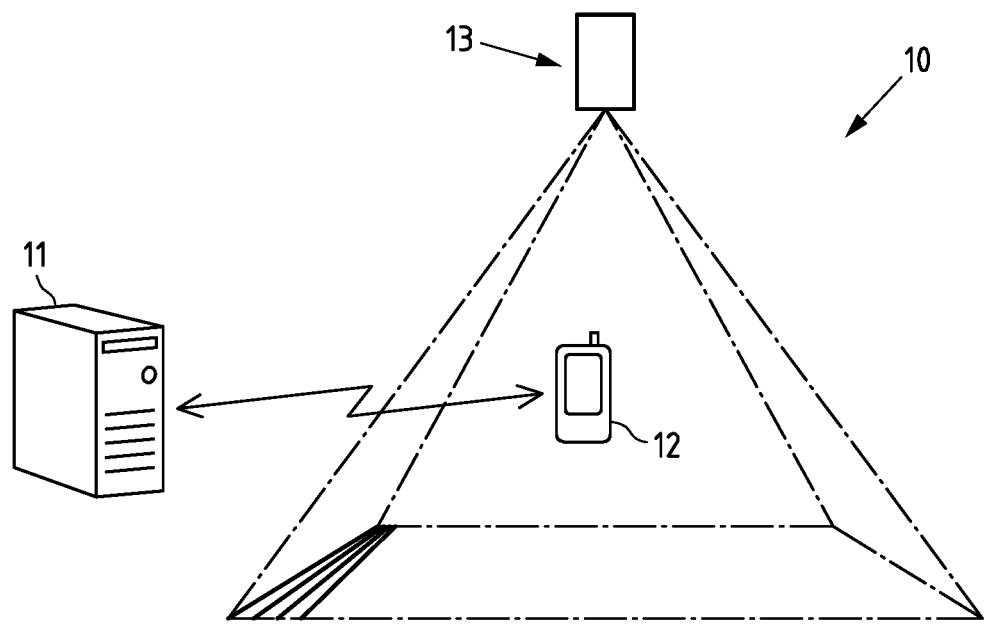
FIG. 1 is a schematic block diagram of a system comprising example embodiments of apparatuses and an example embodiment of a positioning support device.

FIG. 1*a* is a schematic high-level block diagram of a system 10. System 10 comprises a server 11, which may alternatively be embodied as a server cloud (e.g. a plurality of servers connected e.g. via the internet and providing services at least partially jointly), mobile device 12 and a positioning support device 13. Mobile device 12 may receive and measure radiation signals from positioning support device 13 in a signal area 14. Thus, mobile device 12 and/or server 11 may obtain radiation signal data comprising results of measurements on radiation signals. Communication between server 11 and mobile devices 12 may for example, take place at least partially in a wireless fashion, e.g. based on cellular radio communication or on Wireless Local Area Network (WLAN) based communication, to name but a few examples.

Apparatuses 11 and 12 may each be an apparatus according to the first aspect being configured to perform a method according to the first aspect. Positioning support device 13 may be a positioning support device according to the second aspect.

Figure 2:
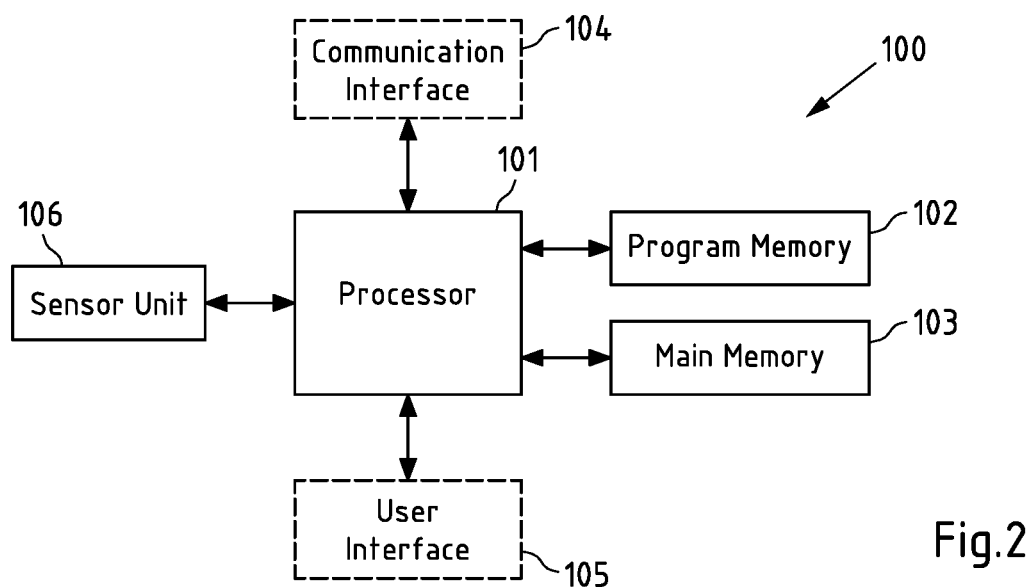
FIG. 2 is a schematic block diagram of an example embodiment of an apparatus.

FIG. 2 is a block diagram of an apparatus 100 according to the first aspect of the invention. Apparatus 100 may for example represent server 11 of system 10. Alternatively or additionally, apparatus 100 may for example represent a mobile device 12 of system 10.

Apparatus 100 comprises a processor 101. Processor 101 may represent a single processor or two or more processors, which are for instance at least partially coupled, for instance via a bus. Processor 101 executes a program code stored in program memory 102 (for instance program code causing apparatus 100 to perform one or more of the embodiments of a method (or parts thereof) according to the first aspect (as for instance further described below with reference to FIG. 3), when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for instance comprise a positioning database. Additionally or alternatively apparatus 100 may comprise or be connected to a positioning database.

Main memory 103 may for instance be a volatile memory. It may for instance be a DRAM memory, to give non-limiting example. It may for instance be used as a working memory for processor 101 when executing an operating system and/or programs.

Processor 101 further controls an optional communication interface 104 configured to communicate with other devices (e.g. for communication between mobile device 12 and server 11), for example by receiving and/or sending data and/or information. The communication may for example be based on a wireless communication connection. The communication interface 104 may thus comprise circuitry such as modulators, filters, mixers, switches and/or one or more antennas to allow wireless transmission and/or reception of signals. In embodiments of the invention, communication interface 104 is inter alia configured to allow communication based on a cellular radio communication (e.g. a 2G/3G/4G/5G cellular radio communication) and/or a non-cellular radio communication (e.g. a WLAN or Bluetooth communication). Alternatively or additionally, the communication may equally well be based on a wirebound communication connection or a combination of wireless and wirebound communication connections. Accordingly, the communication interface 104 may thus comprise circuitry such as modulators, filters, mixers, switches to allow a wirebound transmission and/or reception of signals. In embodiments of the invention, communication interface 104 is inter alia configured to allow communication based on an Ethernet communication such as a LAN (Local Area Network) communication.

Processor 101 further controls an optional user interface 105 configured to present information to a user of apparatus 100 and/or to receive information from such a user. User interface 105 may for instance be the standard user interface via which a user of apparatus 100 controls other functionality thereof. Examples of such a user interface are a touch-sensitive display, a keyboard, a touchpad, a display, etc.

The components 102-105 of apparatus 100 may for instance be connected with processor 101 by means of one or more serial and/or parallel busses.

Apparatus 100, in particular in case of mobile device 12, may further comprise a sensor unit 106. Sensor unit 10 may be or comprise a (front facing) camera, an ambient light sensor and/or a proximity sensor of the mobile device. The sensor unit is in particular sensitive for the radiation (e.g. NIR radiation) emitted by the positioning support device 13.

It is to be understood that apparatus 100 may comprise various other components (e.g. a positioning sensor such as a Global Navigation Satellite System (GNSS) sensor).

Figure 3:
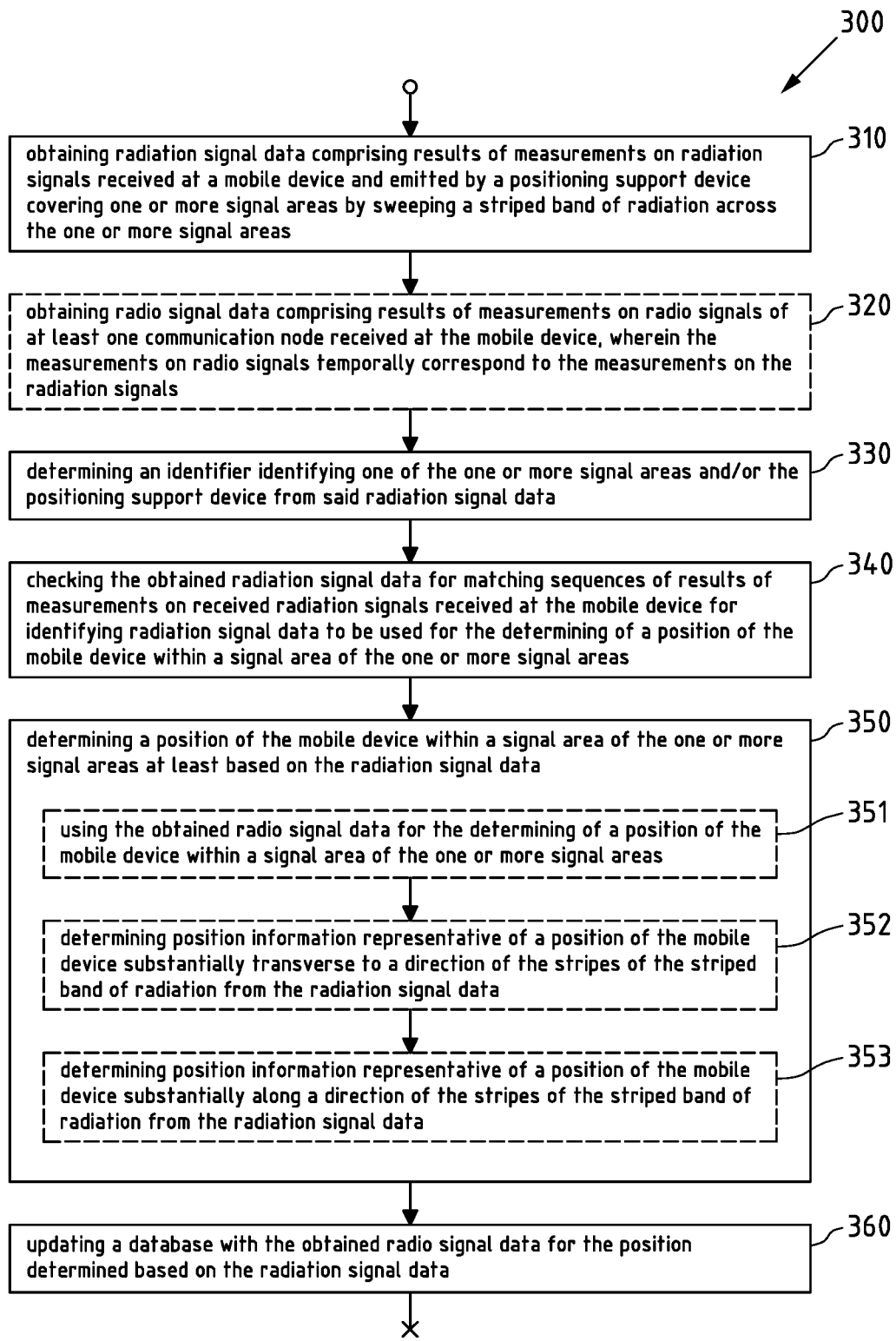
FIG. 3 is a flow chart illustrating an example embodiment of a method.

FIG. 3 is a flowchart 300 illustrating an exemplary embodiment of a method according to the first aspect. The actions of flow chart 300 may generally be performed by server 11 and/or mobile device 12 of FIG. 1. Flow chart 300 will be described in connection with FIGS. 4-8.

The mobile device 12 receives radiation signals emitted by a positioning support device 13 comprising a NIR laser as a radiation source 14. Mobile device 12 or server 11 obtains radiation signal data comprising results of measurements on the radiation signals (action 310).

Figure 4A:
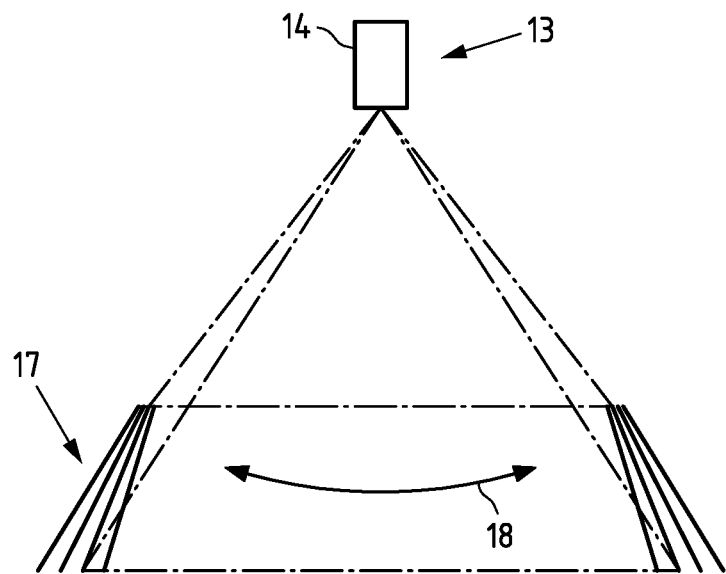
FIG. 4*a,b* are schematic perspective views illustrating exemplary set ups for a signal area.

As depicted in FIG. 4a, the position support device 13 may cover a signal area 16 by sweeping a striped band of radiation 17 across the signal area 16. The signal area has a substantially pyramidal geometry. The sweeping of the striped band of radiation is illustrated by arrow 18. The striped band of radiation 17 comprises at a certain time or time interval and in a horizontal plane through the signal area 16 a pattern of radiation in the form of spatial stripes arranged in a band. For illustrative purposes, the striped band of radiation 17 is visualized for two different times at its two turning points. In the setup illustrated in FIG. 4a, the radiation source 14 is positioned at the ceiling and emits radiation downwards and produces signal area 16.

Figure 4B:
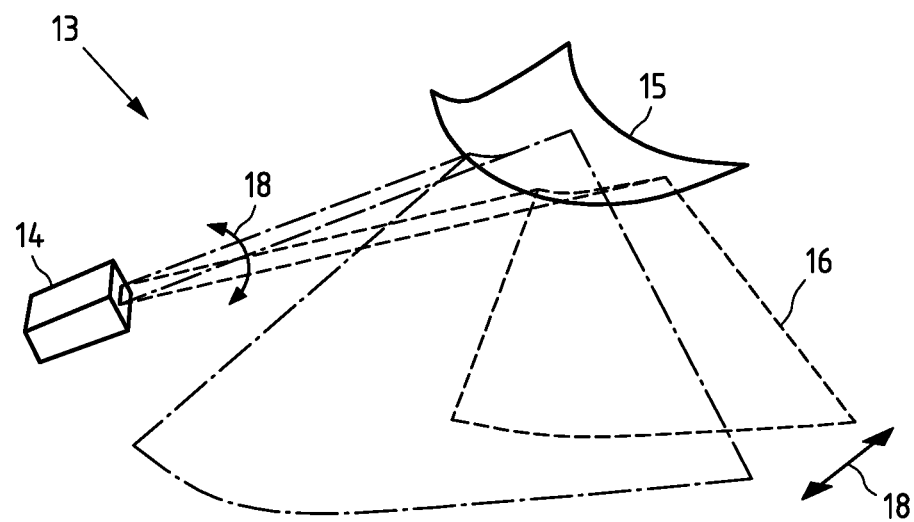

FIG. 4b illustrates an alternative setup of the positioning support device 13, which comprises additionally to the radiation source 14 a curved convex mirror as a deflection unit 15. In this case, the radiation source emits radiation onto a mirror 15 which is positioned at the ceiling deflecting radiation of radiation source 14 downwards and produces signal area 16. The sweeping of the striped band of radiation across the signal area 16 is illustrated by arrow 18. Again, the signal area 16 has a substantially pyramidal geometry.

Figure 5:
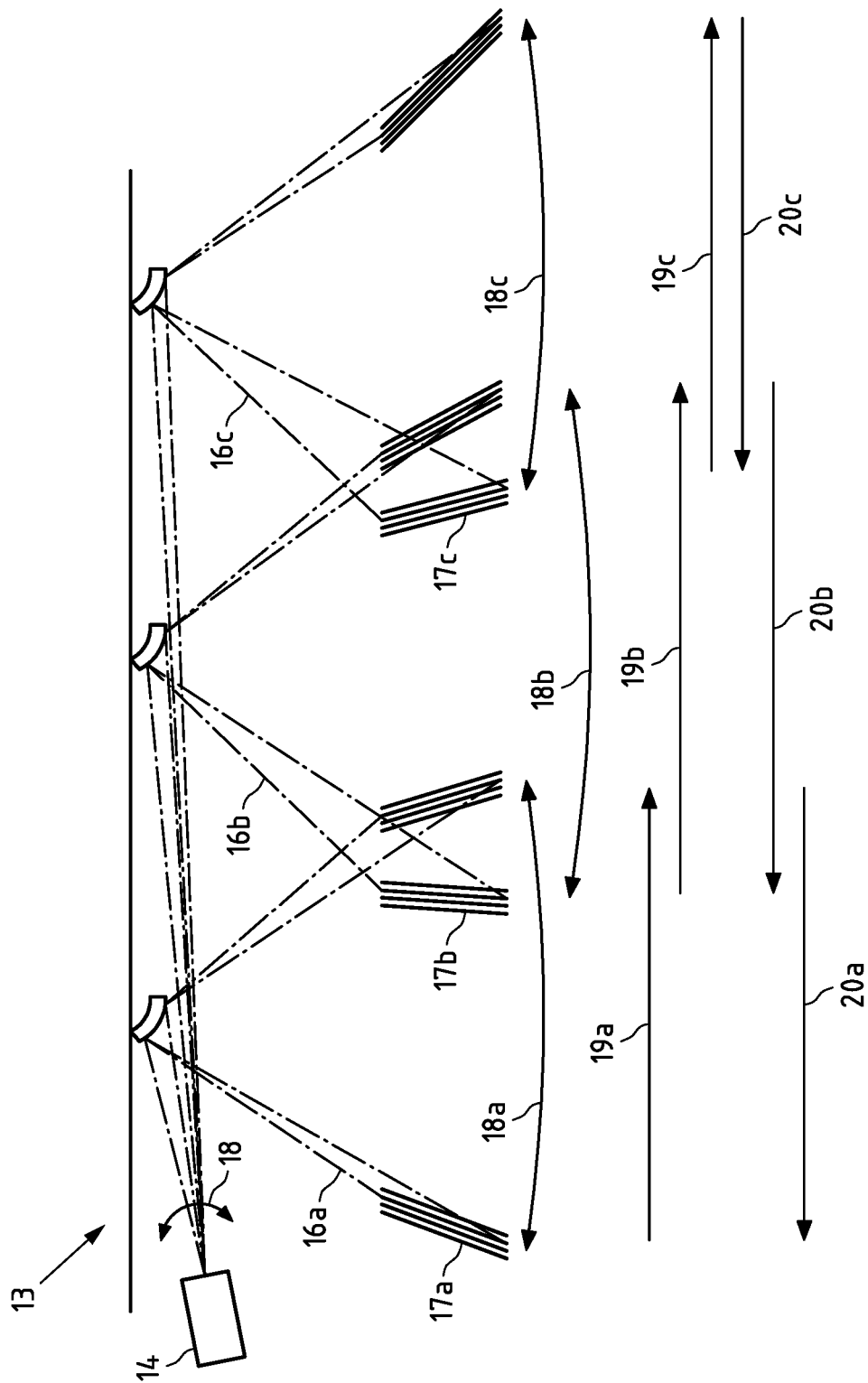
FIG. 5 is a schematic perspective view illustrating an exemplary setup for multiple signal areas.

Another alternative setup of a positioning support device 13 for multiple signal areas is illustrated by the schematic perspective view of FIG. 5. In this embodiment, the positioning support device 13 comprises, apart from a radiation source 14, multiple deflection units 15a, 15b, 15c which are arranged at the ceiling, so that each deflection unit 15a, 15b, 15c is at least partially in the line of sight of the radiation source 14. Each deflection unit 15a, 15b, 15c deflects radiation of radiation source 14 downwards and produces a respective signal area 16a, 16b, 16c of substantially pyramidal geometry. The sweeping of the respective striped band of radiation 17a, 17b, 17c across the respective signal area 16a, 16b, 16c is again illustrated by arrows 18, 18a, 18b, 18c, The respective striped band of radiation may first be swept forward across each signal area (arrows 19a, 19b, 19c) and then backwards across each signal area (arrows 20c, 20b, 20a).

In this setup, a position information representative of a substantially vertical position of the mobile device may be determined in particular based on the radiation signal data. In the overlapping areas, radiation signals from two overlapping signal areas are received at one location. However, the overlap or the received radiation signals are dependent on the height of the mobile device, enabling the determination of the height from the floor of the mobile device.

The mobile device 12 may optionally also receive and measure radio signals of one or more communication nodes (not shown). The mobile device 12 or server 11 may thus obtain radio signal data comprising results of measurements on radio signals of the communication node (action 320). The measurements on radio signals temporally correspond to the measurements on the radiation signals, e.g. as they are taken at the same time.

As the striped band of radiation 17 is composed of a band of stripes, a (unique) identifier may be encoded into the striped band of radiation 17. Thus, an identifier identifying one of the signal areas 16, 16a, 16b, 16c and/or the positioning support device 14 may be determined from the radiation signal data (action 330). For instance, a stripe-width-modulation may be used. As the striped band of radiation is swept across the mobile device 12, the sensor of the mobile device detects radiation pulses. Thus, from the perspective of the mobile device 12, the identifier is encoded by means of a pulse-width-modulation.

It may be advantageous, if a convention is established in order for the mobile device's sensor to identify in which sweeping direction the striped band of radiation is passing over it. This information can be encoded within the stripes, for example. For instance, the first stripe can be wider than any other subsequent stripe within the striped band of radiation. Alternatively, a special encoding of the identifier within the stripes can be used that could result in a failure in decoding if the radiation signals were read in reverse order.

The obtained radiation signal data are then checked for matching sequences of results of measurements on received radiation signals received at the mobile device (action 340). In this way, radiation signal data to be used for the determining of a position of the mobile device 12 within a signal area of the one or more signal areas 16, 16a, 16b, 16c can be identified.

As an example, a buffer may be used to store the occurrence of radiation signals (e.g. light pulses) each with a time stamp and/or a time delta from last received signal. The buffer has to be wide enough for a number of results on measurements resulting from at least one full sweeping cycle. The bigger the buffer is, the more likely it would satisfy longer sweeping cycles, but the more it would impose expensive processing time for its content later. The results on measurements from the respective sensor may continuously be sampled. Based on this, the occurrence of each peek is detected and stored along with its timing information in the buffer.

With the introduction of each entry into the buffer, the buffer is searched from the beginning of the buffer for the occurrence of matching sequences of time deltas for a certain number of last entries. Based on this, the longest match sequence is detected. The sequence at the top of the buffer and the previous matching sequence in the buffer are a good candidate for radiation signals corresponding to a complete detected forward/backward sweep.

In the following, an example of determining a position of the mobile device 12 within a signal area 16, 16a, 16b, 16c based on the radiation signal data is described with reference to FIGS. 6-8 (action 350).

In case radio signal data was previously obtained (action 320), the radio signal data may be used for the determining of a position of the mobile device (action 351). For instance, a (comparatively coarse) position of the mobile device may be determined solely based on the radio signal data. A more precise position of the mobile device within a signal area may then be determined as follows.

For the (more precise) determining of the position, position information representative of a position of the mobile 12 device substantially transverse to a direction of the stripes of the striped band of radiation 17 may be determined from the radiation signal data (action 352). While the direction substantially transverse to the direction of the stripes of the striped band of radiation 17 may also be referred to as y-direction, the direction substantially along the direction of the stripes of the striped band of radiation 17 may also be referred to as x-direction. The striped band of radiation is swept across the signal area 16 in y-direction with angle "A" in total. Thus, sweeping angle "a" indicating a triangular plane that the mobile device 12 within the overall pyramidal signal area 16 with the full angle "A" lies in (as illustrated in FIG. 6) may be considered a position information representative of a position of the mobile 12 device substantially transverse to a direction of the stripes of the striped band of radiation 17.

Figure 6:
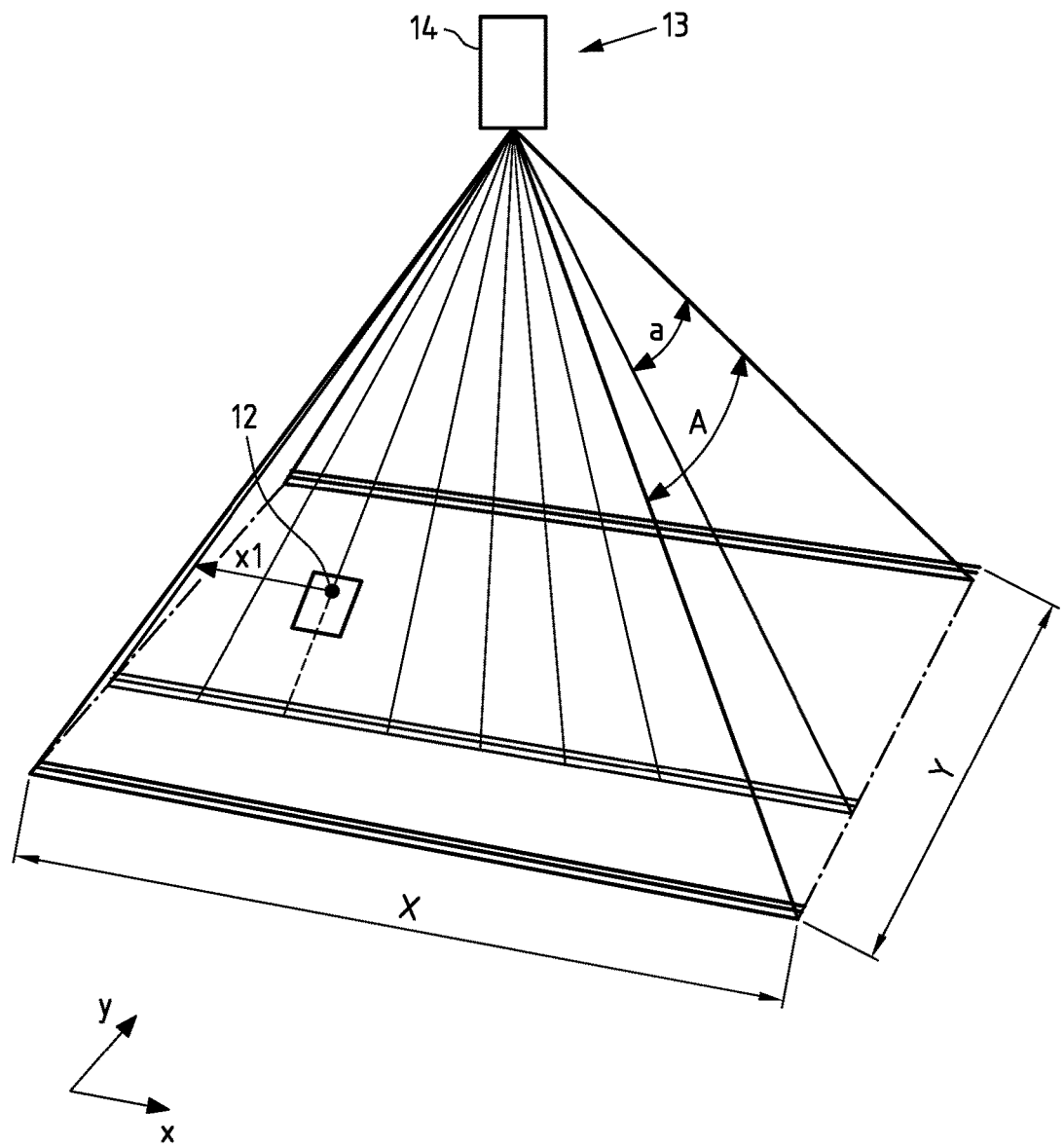
FIG. 6 is a schematic perspective view illustrating a position of a mobile device in an exemplary signal area.
Figure 7:
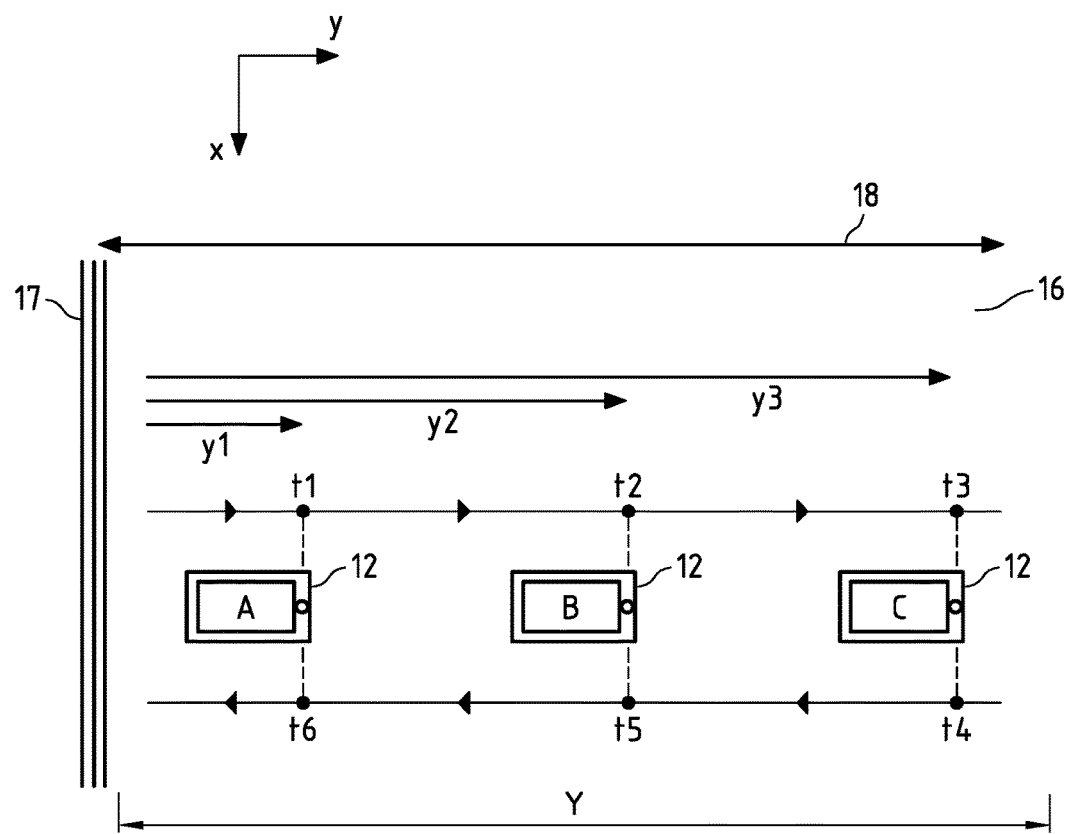
FIG. 7 is a schematic top view exemplarily illustrating the positioning of a mobile device transverse to the direction of the stripes of the striped band of radiation.

FIG. 7 illustrates a top view of FIG. 6 with three different exemplary positions A, B, C of mobile device 12. The sensor unit of the mobile device 23 detects the striped band of radiation sweeping over it at certain times t. If the characteristics of the respective signal area 16, in particular the sweeping cycle time T and the full sweeping distance Y, are known, the distances y1, y2, y3 from the border of the signal area 16 or sweeping cycle start line (left border of FIG. 7) can be calculated as follows:

$$y1=[(T-(t6-t1))/T]*Y$$

$$y2=[(T-(t5-t2))/T]*Y$$

$$y3=[(T-(t4-t3))/T]*Y$$

with

T: sweeping cycle time, time for sweeping completely forward and backward;
Y: distance between borders of signal area (i.e. pyramid base) in a direction substantially transverse to the direction of the stripes of the striped band of radiation;
t1: time at which striped band sweeps over mobile device at position A while on its forward sweep;
t2: time at which striped band sweeps over mobile device at position B while on its forward sweep;
t3: time at which striped band sweeps over mobile device at position C while on its forward sweep;
t4: time at which striped band sweeps over mobile device at position C while on its backward sweep;
t5: time at which striped band sweeps over mobile device at position B while on its backward sweep;
t6: time at which striped band sweeps over mobile device at position A while on its backward sweep;
y1: distance of mobile device at position A from border of signal area;
y2: distance of mobile device at position B from border of signal area;
y3: distance of mobile device at position C from border of signal area.

More generally this may be expressed as $$y=[(T-(t'-t''))/T]*Y$$

with t'': time at which striped band sweeps over mobile device while on its forward sweep;
t': time at which striped band sweeps over mobile device while on its backward sweep;
y: distance of mobile device from border of signal area.

With regard to the described buffer, the sequence at the top of the buffer and the previous matching sequence in the buffer are a good candidate for radiation signals corresponding to a complete detected forward/backward sweep. Thus, the time stamp of the occurrence of the previous (older) matching sequence would be t'' and the time stamp of the occurrence of the recent (younger) matching sequence would be t'.

As the determined distance y is (sinusoidally) proportional to the angle a, the angle "a" may be calculated from distance y.

From the calculations above it is clear that the mobile device does not require any awareness of the sweeping cycle's start timing or be in sync with it, as it only uses the timing deltas between each sweep across the mobile device.

Further, for the (more precise) determining of the position, position information representative of a position of the mobile 12 device substantially along the direction of the stripes of the striped band of radiation 17 (along the x-direction, cf. FIG. 6) may be determined from the radiation signal data (action 353).

Figure 8A:
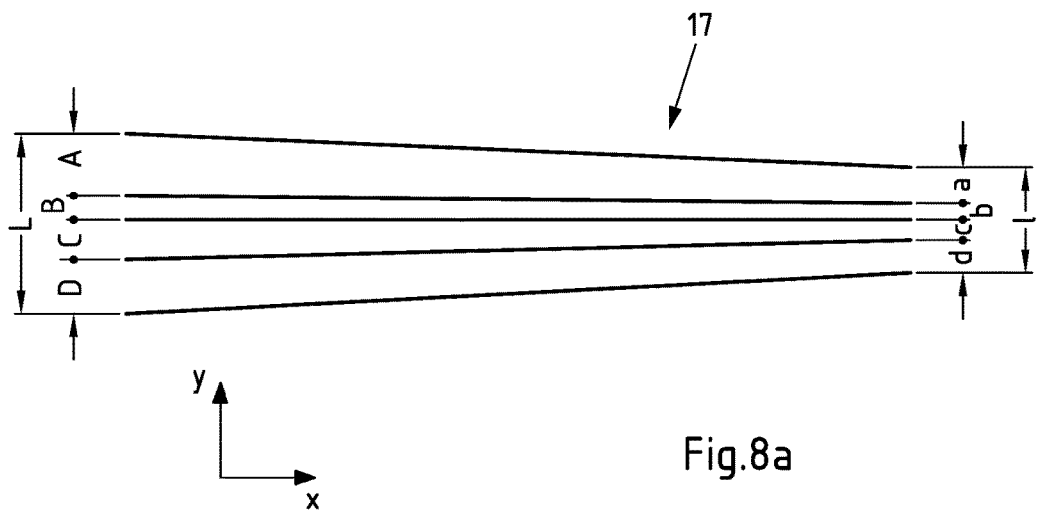
FIG. 8*a,b* are schematic top views exemplarily illustrating the positioning of a mobile device along the direction of the stripes of the striped band of radiation.

As illustrated in FIGS. 8a and b, which are schematic top views of the striped band of radiation 17, the individual stripes of the striped band of radiation comprises stripes spatially tilted to one another as seen in a substantially horizontal plane (e.g. at the bottom of the signal area or at a typical height of a mobile device in use, e.g. 1 meter).

As can be seen in FIG. 8, the distances between the stripes of the striped band of radiation is stretched on one end and compressed on the opposite end with a gradual transition between the two ends. The ratio between distances on each side remains unchanged. With regard to FIG. 8a, this yields the geometric relations (with the width L of the band on one end and width 1 of the band on the other end, and L>1):

$A/L=a/l;$ $B/L=b/l;$ $C/L=c/l;$ $D/L=d/l;$

Figure 8B:
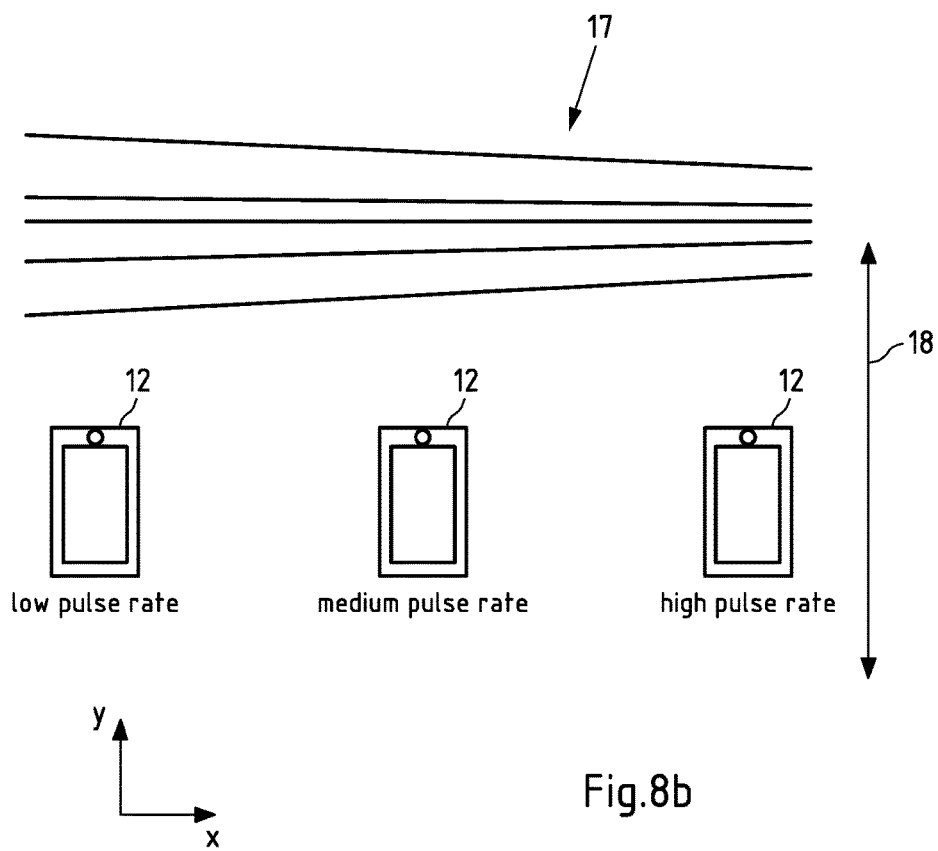

As a result, when the striped band of radiation 17 passes over a mobile device, the sensor unit will still be able to determine an identifier, but it will receive different pulse rates in dependence of the mobile device's position along the x-direction of the signal area 17, which is illustrated in FIG. 8b. With regard to FIG. 8b, the closer the mobile device 12 is to left side, the lower the pulse rate would be, while the closer the mobile device is to right side, the higher the pulse rate would be.

With regard to the described buffer, the pulse rate or the overall duration for the striped band of radiation to pass the mobile device may be determined from the detected matching sequences in the buffer. The pulse rate or the duration may be used to derive the mobile devices position substantially along the stripes of the striped band of radiation. This may yield distance x1 indicated in FIG. 6.

As a result a the positioning base on radio signals is can be enhanced and a precise (horizontal) position of the mobile device 2, which may in particular be more precise than the position determined based on the radio signal data, can be determined.

The precisely determined position may additionally or alternatively be used for updating a database with the obtained radio signal data for the position determined based on the radiation signal data (action 360).

This may allow for enriching a radio model. In one example, the position determined based on the radiation signal data is expected to have a higher accuracy compared to a position determined based on the radio signal data (e.g. a WLAN or BT positioning). Thus, it can be determined that accurately at a certain position (determined due to the radiation signal data) a certain radiation signal (e.g. signal strength of a WLAN or BT with a certain ID) was measured. In fact, a whole radio model (e.g. a radio map) may be generated based on this approach.

The described procedures may in particular have the following advantages:

High accuracy of the determined position. In particular positioning support devices with a radiation laser source can be of a high accuracy in terms of timing and projected stripe patterns.

Expandability: The signal areas can be expanded to cover wider areas (especially corridors) while the mobile devices can still determine their position uniquely within each signal area.

Using an array of deflection units suites very much corridors, while still a single radiation source can be used and a synchronized sweeping timing among the array's signal areas can be achieved.

In case of an IR laser radiation source, the setup does not distort the venue's interior look, as the swept striped band is only visible to the mobile device's sensor, but not to the human eye.

A hybridization approach with WLAN and/or BT positioning produces an overall more accurate positioning and an up-to-date radio model for WLAN and/or BT positioning.

Figure 9:
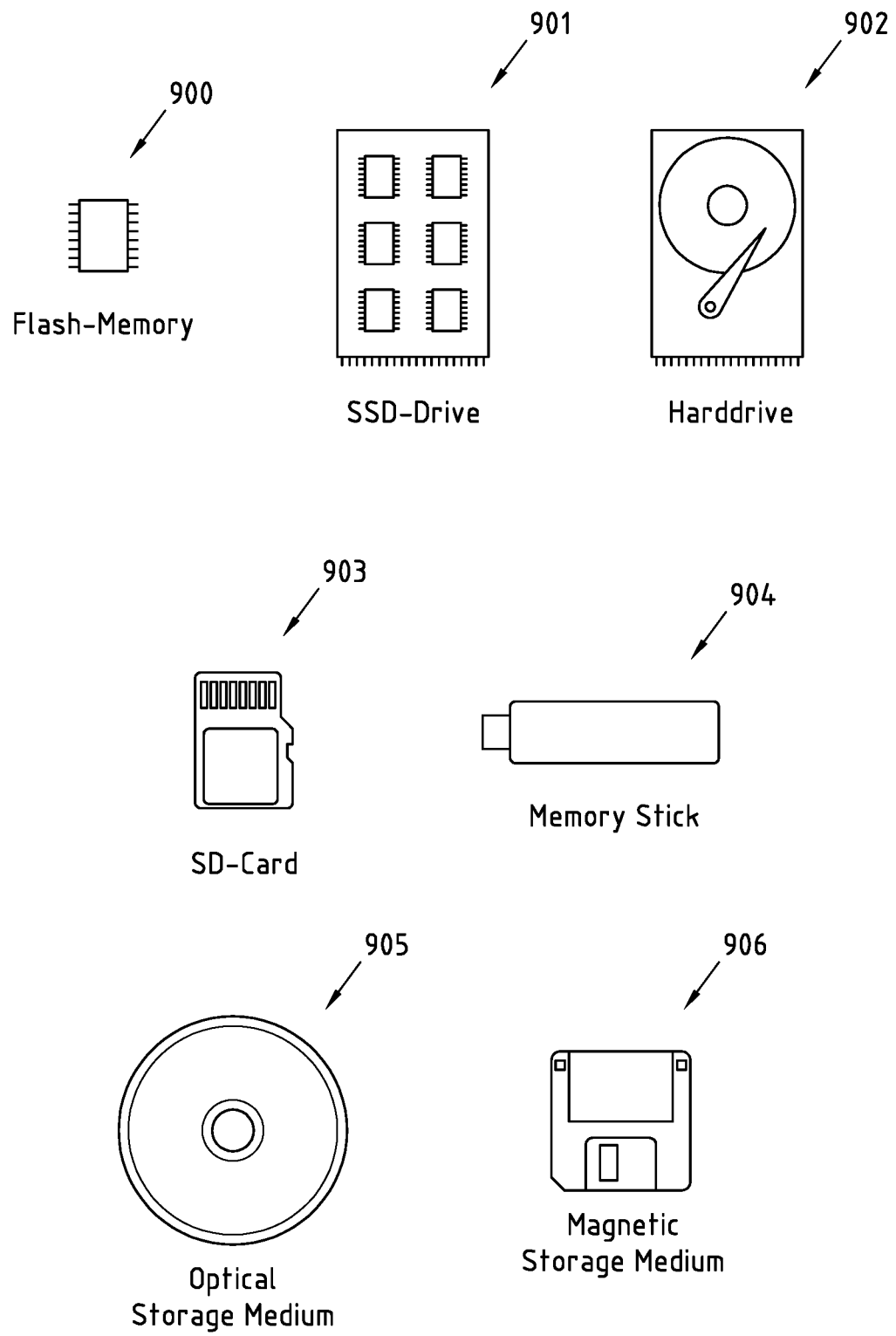
FIG. 9 schematically illustrates example removable storage devices.

FIG. 9 is a schematic illustration of examples of tangible storage media according to the present invention, that may for instance be used to implement memory of server 11 of FIG. 1a, or program memory 102 of FIG. 2. To this end, FIG. 9 displays a flash memory 900, which may for instance be soldered or bonded to a printed circuit board, a solid-state drive 901 comprising a plurality of memory chips (e.g. Flash memory chips), a magnetic hard drive 902, a Secure Digital (SD) card 903, a Universal Serial Bus (USB) memory stick 904, an optical storage medium 905 (such as for instance a CD-ROM or DVD) and a magnetic storage medium 906.

The following embodiments of the invention are also disclosed:

Embodiment 1

Method performed by at least one apparatus, said method comprising:
    obtaining radiation signal data comprising results of measurements on radiation signals received at a mobile device and emitted by a positioning support device covering one or more signal areas by sweeping a striped band of radiation across said one or more signal areas; and
    determining a position of said mobile device within a signal area of said one or more signal areas at least based on said radiation signal data.

Embodiment 2

Method according to embodiment 1, wherein said radiation is laser radiation, in particular laser radiation of the non-visible spectrum, preferably of the infrared spectrum, in particular of the near infrared spectrum.

Embodiment 3

Method according to embodiment 1 or 2, wherein said radiation signal data comprises results of timing measurements on said received radiation signals.

Embodiment 4

Method according to any of embodiments 1 to 3, wherein said striped band of radiation is swept across said one or more signal areas in a direction substantially transverse to a direction of said stripes of said striped band of radiation in sweeping cycles.

Embodiment 5

Method according to any of embodiments 1 to 4, wherein at least a part of said one or more signal areas covered by said positioning support device has a substantially pyramidal geometry.

Embodiment 6

Method according to any of embodiments 1 to 5, wherein said striped band of radiation comprises stripes spatially tilted to one another.

Embodiment 7

Method according to any of embodiments 1 to 6, wherein said method further comprises:
  determining an identifier identifying one of said one or more signal areas and/or said positioning support device from said radiation signal data.

Embodiment 8

Method according to any of embodiments 1 to 7, wherein said determining of a position of said mobile device within a signal area of said one or more signal areas comprises:
  determining position information representative of a position of said mobile device substantially transverse to a direction of said stripes of said striped band of radiation from said radiation signal data.

Embodiment 9

Method according to embodiment 8, wherein said determining of position information representative of a position of said mobile device substantially transverse to said direction of said stripes of said striped band of radiation is based on a timing measurement representative of a time interval between passes of said striped band of radiation at said mobile device.

Embodiment 10

Method according to embodiment 8 or 9, wherein said determining of position information representative of a position of said mobile device substantially transverse to said direction of said stripes of said striped band of radiation comprises determining a sweeping angle of a plane intersecting with said position of said mobile device within a signal area of said one or more signal areas.

Embodiment 11

Method according to any of embodiments 1 to 10, wherein said determining of a position of said mobile device within a signal area of said one or more signal areas comprises:
  determining position information representative of a position of said mobile device substantially along a direction of said stripes of said striped band of radiation from said radiation signal data.

Embodiment 12

Method according to embodiment 11, wherein said determining of position information representative of a position of said mobile device substantially along said direction of said stripes of said striped band of radiation is based on a timing measurement representative of a width of said striped band of radiation at said mobile device.

Embodiment 13

Method according to any of embodiment 1 to 12, wherein said obtained radiation signal data comprises results of measurements on radiation signals received at said mobile device during at least one complete sweeping cycle.

Embodiment 14

Method according to any of embodiments 1 to 13, wherein said method further comprises:
  checking said obtained radiation signal data for matching sequences of results of measurements on received radiation signals received at said mobile device for identifying radiation signal data to be used for said determining of a position of said mobile device within a signal area of said one or more signal areas.

Embodiment 15

Method according to any of embodiments 1 to 14, wherein said method further comprises:
  obtaining radio signal data comprising results of measurements on radio signals of at least one communication node received at said mobile device, wherein said measurements on radio signals temporally correspond to said measurements on said radiation signals.

Embodiment 16

Method according to embodiment 15, wherein said method further comprises:
  using said obtained radio signal data for said determining of a position of said mobile device within a signal area of said one or more signal areas.

Embodiment 17

Method according to embodiment 15 or 16, wherein said method further comprises:
  updating a database with said obtained radio signal data for said position determined based on said radiation signal data.

Embodiment 18

Method according to any of embodiments 1 to 17, wherein said method further comprises:
  obtaining a database or a part thereof at said mobile device, said database comprising information on characteristics on at least one of said one or more signal areas and/or said positioning support device; wherein said determining of a position of said mobile device within a signal area of said one or more signal areas is performed at said mobile device at least based on said radiation signal data and optionally based on said radio signal data using said obtained database or said part thereof.

Embodiment 19

Method according to any of embodiments 1 to 17, wherein said obtaining of said radiation signal data and optionally said radio signal data is performed at a server; wherein said determining of a position of said mobile device within a signal area of said one or more signal areas at least based on said radiation signal data and optionally based on said radio signal data is performed at said server; wherein said method further comprises:
  sending said determined position information to said mobile device.

Embodiment 20

An apparatus comprising means for performing the steps of the method according to any one of embodiments 1 to 19.

Embodiment 21

An apparatus comprising at least one processor and at least one memory including computer program code for one or more programs, the at least one memory and the computer program code configured to, with the at least one processor, cause the apparatus to perform the steps of the method according to any one of embodiments 1 to 19.

Embodiment 22

The apparatus according to any one of embodiments 20 to 21, wherein said apparatus is one of:
  a chip;
  a module for a server;
  a server;
  a module for a mobile device; and
  a mobile device.

Embodiment 23

A computer program code, the computer program code when executed by a processor causing an apparatus to perform the steps of the method according to one of embodiments 1 to 19.

Embodiment 24

A non-transitory computer readable storage medium including one or more sequences of one or more instructions which, when executed by one or more processors, cause an apparatus to perform the steps of the method according to any one of embodiments 1 to 19.

Embodiment 25

Positioning support device for supporting determining of positions of mobile devices in one or more signal areas, comprising:
  a radiation source covering said one or more signal areas by sweeping a striped band of radiation across said one or more signal areas.

Embodiment 26

Positioning support device according to embodiment 25, wherein said radiation source is a laser radiation source, in particular emitting laser radiation of the non-visible spectrum, preferably of the infrared spectrum, in particular of the near infrared spectrum.

Embodiment 27

Positioning support device according to embodiment 25 or 26, wherein said positioning support device is configured to sweep said striped band of radiation across said one or more signal areas in a direction substantially transverse to a direction of said stripes of said striped band of radiation in sweeping cycles.

Embodiment 28

Positioning support device according to any of embodiments 25 to 27, wherein said positioning support device is configured for delaying a start of a sweeping cycle.

Embodiment 29

Positioning support device according to any of embodiments 25 to 28, wherein said positioning support device is configured to provide for at least a part of said one or more signal areas covered by said positioning support device a substantially pyramidal geometry.

Embodiment 30

Positioning support device according to any of embodiments 25 to 29, wherein said positioning support device is configured for providing said striped band of radiation with stripes spatially tilted to one another.

Embodiment 31

Positioning support device according to any of embodiments 25 to 30, wherein the positioning support device is configured to modulate said striped band of radiation such that it carries an identifier identifying one of said one or more signal areas and/or said positioning support device.

Embodiment 32

Positioning support device according to any of embodiments 25 to 31, further comprising:
  one or more deflection units for deflecting radiation of said radiation source into said one or more signal areas.

Embodiment 33

System comprising:
  a position support device according to any of the embodiments 25 to 32; and
  an apparatus according to any of the embodiments 20 to 22.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/ software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 101 of FIG. 2 could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. Method performed by at least one apparatus, said method comprising:
  obtaining radiation signal data comprising results of measurements on radiation signals received at a mobile device and emitted by a positioning support device covering one or more signal areas by sweeping a striped band of radiation across said one or more signal areas, wherein the striped band of radiation extends in a first direction in which the striped band is swept; and
  determining a position of said mobile device within a signal area of said one or more signal areas at least based on said radiation signal data by determining position information representative of a position of said mobile device in the first direction based upon measurements from said radiation signal data,
  wherein determining position information representative of a position of said mobile device in the first direction comprises determining position information representative of the position of said mobile device in the first direction based upon a difference in times at which the striped band of radiation sweeps over the mobile device on a forward sweep and a backward sweep.

2. Method according to claim 1, wherein said radiation is laser radiation, in particular laser radiation of the non-visible spectrum, preferably of the infrared spectrum, in particular of the near infrared spectrum.

3. Method according to claim 1, wherein said radiation signal data comprises results of timing measurements on said received radiation signals.

4. Method according to a claim 1, wherein said striped band of radiation is swept across said one or more signal areas in a direction substantially transverse to a direction of said stripes of said striped band of radiation in sweeping cycles.

5. Method according to claim 1, wherein at least a part of said one or more signal areas covered by said positioning support device has a substantially pyramidal geometry.

6. Method according to claim 1, wherein said striped band of radiation comprises stripes spatially tilted to one another.

7. Method according to claim 1, wherein said method further comprises:
determining an identifier identifying one of said one or more signal areas and/or said positioning support device from said radiation signal data.

8. Method according to claim 1, wherein said obtained radiation signal data comprises results of measurements on radiation signals received at said mobile device during at least one complete sweeping cycle.

9. Method according to claim 1, wherein said method further comprises:
checking said obtained radiation signal data for matching sequences of results of measurements on received radiation signals received at said mobile device for identifying radiation signal data to be used for said determining of a position of said mobile device within a signal area of said one or more signal areas.

10. Method according to claim 1, wherein said method further comprises:
obtaining radio signal data comprising results of measurements on radio signals of at least one communication node received at said mobile device, wherein said measurements on radio signals temporally correspond to said measurements on said radiation signals.

11. Method according to claim 10, wherein said method further comprises:
using said obtained radio signal data for said determining of a position of said mobile device within a signal area of said one or more signal areas.

12. Method according to claim 10, wherein said method further comprises:
updating a database with said obtained radio signal data for said position determined based on said radiation signal data.

13. Method according to claim 1, wherein said method further comprises:
obtaining a database or a part thereof at said mobile device, said database comprising information on characteristics on at least one of said one or more signal areas and/or said positioning support device; wherein said determining of a position of said mobile device within a signal area of said one or more signal areas is performed at said mobile device at least based on said radiation signal data and optionally based on said radio signal data using said obtained database or said part thereof.

14. Method according to claim 1, wherein said obtaining of said radiation signal data and optionally said radio signal data is performed at a server; wherein said determining of a position of said mobile device within a signal area of said one or more signal areas at least based on said radiation signal data and optionally based on said radio signal data is performed at said server; wherein said method further comprises:
sending said determined position information to said mobile device.

15. Method according to claim 1, wherein the striped band of radiation also extends in a second direction transverse to the first direction in which the striped band is swept, wherein determining the position of said mobile device comprises determining position information representative of the position of said mobile device in the second direction based upon measurements from said radiation signal data, and wherein determining position information representative of the position of said mobile device in the second direction comprises determining position information representative of the position of said mobile device in the second direction based upon a pulse rate or an overall duration for the striped band of radiation to pass the mobile device.

16. An apparatus comprising at least one processor and at least one memory including computer program code for one or more programs, the at least one memory and the computer program code configured to, with the at least one processor, cause the apparatus to perform the steps of a method, said method comprising:
obtaining radiation signal data comprising results of measurements on radiation signals received at a mobile device and emitted by a positioning support device covering one or more signal areas by sweeping a striped band of radiation across said one or more signal areas, wherein the striped band of radiation extends in a first direction in which the striped band is swept; and
determining a position of said mobile device within a signal area of said one or more signal areas at least based on said radiation signal data by determining position information representative of a position of said mobile device in the first direction based upon measurements from said radiation signal data,
wherein determining position information representative of a position of said mobile device in the first direction comprises determining position information representative of the position of said mobile device in the first direction based upon a difference in times at which the striped band of radiation sweeps over the mobile device on a forward sweep and a backward sweep.

17. A non-transitory computer readable storage medium including one or more sequences of one or more instructions which, when executed by one or more processors, cause an apparatus to perform the steps of a method, said method comprising:
obtaining radiation signal data comprising results of measurements on radiation signals received at a mobile device and emitted by a positioning support device covering one or more signal areas by sweeping a striped band of radiation across said one or more signal areas, wherein the striped band of radiation extends in a first direction in which the striped band is swept; and
determining a position of said mobile device within a signal area of said one or more signal areas at least based on said radiation signal data by determining position information representative of a position of said mobile device in the first direction based upon measurements from said radiation signal data,
wherein determining position information representative of a position of said mobile device in the first direction comprises determining position information representative of the position of said mobile device in the first direction based upon a difference in times at which the striped band of radiation sweeps over the mobile device on a forward sweep and a backward sweep.

18. A system for supporting determining of positions of mobile devices in one or more signal areas, comprising:
- a radiation source covering said one or more signal areas by sweeping a striped band of radiation across said one or more signal areas, wherein the striped band of radiation extends in a first direction in which the striped band is swept, and wherein the radiation source is configured to alternately sweep the striped band of radiation in a forward sweep and a backward sweep, opposite the forward sweep, and
- at least one processor configured to determine position information representative of a position of a mobile device within a signal area in the first direction based upon a difference in times at which the striped band of radiation sweeps over the mobile device in the forward sweep and the backward sweep.

19. A system according to claim 18, wherein said radiation source is a laser radiation source, in particular emitting laser radiation of the non-visible spectrum, preferably of the infrared spectrum, in particular of the near infrared spectrum.

20. A system according to claim 18, further comprising a plurality of deflection units, wherein each deflection unit is configured to sweep radiation from the radiation source across an at least partially different signal area.

21. A system according to claim 18, wherein said radiation source is configured for delaying a start of a sweeping cycle.

22. A system according to claim 18, wherein said radiation source is configured to provide for at least a part of said one or more signal areas covered by said radiation source a substantially pyramidal geometry.

23. A system according to claim 18, wherein said radiation source is configured for providing said striped band of radiation with stripes spatially tilted to one another so as to define a stripe with a width, as measured in the first direction, that varies in the second direction transverse to the first direction in which the striped band is swept.

24. A system according to claim 18, wherein the radiation source is configured to modulate said striped band of radiation such that it carries an identifier identifying one of said one or more signal areas and/or said positioning support device.

25. A system according to claim 18, further comprising:
- one or more deflection units for deflecting radiation of said radiation source into said one or more signal areas.

26. Apparatus according to claim 18, wherein the striped band of radiation also extends in a second direction transverse to the first direction in which the striped band is swept, wherein the at least one memory and the computer program code are configured to, with the at least one processor, cause the apparatus to determine the position of said mobile device by determining position information representative of the position of said mobile device in the second direction based upon measurements from said radiation signal data, and wherein the at least one memory and the computer program code are configured to, with the at least one processor, cause the apparatus to determine position information representative of the position of said mobile device in the second direction by determining position information representative of the position of said mobile device in the second direction based upon a pulse rate or an overall duration for the striped band of radiation to pass the mobile device.

* * * * *